United States Patent [19]

Sato et al.

[11] 4,215,902
[45] Aug. 5, 1980

[54] ANTI-SKID BRAKE CONTROL DEVICE AND ASSOCIATED METHOD

[75] Inventors: Makoto Sato, Kamifukuoka; Hiroshi Takamatsu, Ohimachi; Yoshitaka Miyagawa, Kawagoe; Etsuo Fujii, Wako, all of Japan

[73] Assignee: Honda Giken Kogyo Kabushiki Kaisha, Tokyo, Japan

[21] Appl. No.: 936,935

[22] Filed: Aug. 25, 1978

Related U.S. Application Data

[62] Division of Ser. No. 762,782, Jan. 25, 1977, Pat. No. 4,129,342.

[30] Foreign Application Priority Data

Jan. 29, 1976 [JP] Japan .................................. 51/8682
Feb. 2, 1976 [JP] Japan .................................. 51/10195
Feb. 16, 1976 [JP] Japan .................................. 51/15607

[51] Int. Cl.³ .......................... B60T 8/02; B60T 13/68
[52] U.S. Cl. ..................................... 303/119; 303/113
[58] Field of Search ............... 303/97, 105, 106, 110, 303/113, 118, 119, 117, 20; 188/181 R, 181 A

[56] References Cited

U.S. PATENT DOCUMENTS 3,549,212 12/1970 Leiber .................................. 303/119
3,744,852 7/1973 Riordan ................................ 303/20

Primary Examiner—Reinhard J. Eisenzopf
Attorney, Agent, or Firm—Haseltine, Lake & Waters

[57] ABSTRACT

An anti-skid brake control device and associated method in which the device includes a wheel cylinder having defined therein a first hydraulic chamber connected with a brake fluid line extending from the master cylinder and a second hydraulic chamber connected with a pressure controlling fluid circuit. As the brake fluid line is isolated from the pressure controlling circuit by the output member of the wheel cylinder, the brake system can operate effectively, though in a conventional manner, should oil leakage occur in the controlling circuit. On a four-wheeled vehicle, each pair of front or rear wheel cylinders can be served by a common arrangement of such pressure controlling circuit for anti-skid control.

2 Claims, 3 Drawing Figures

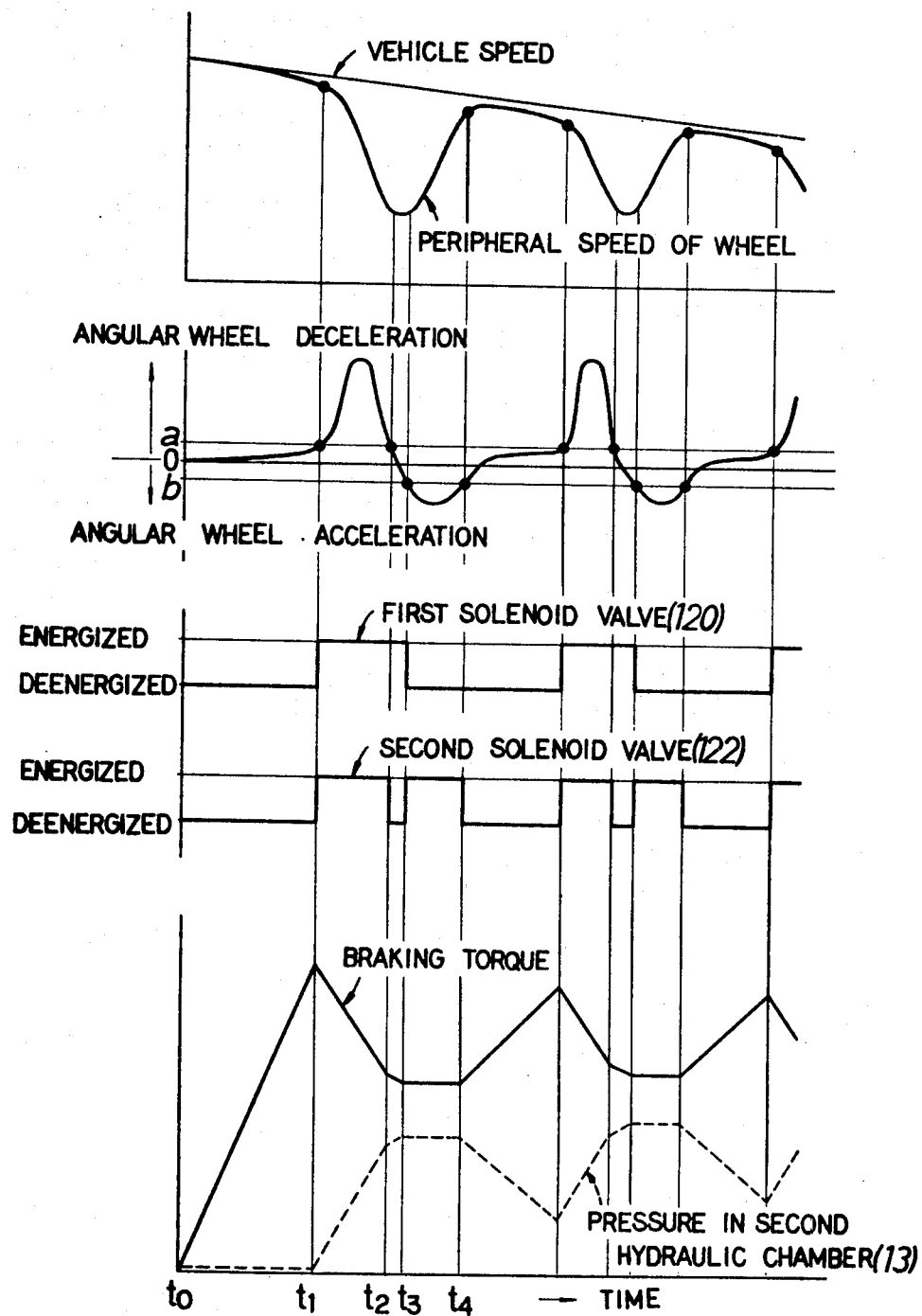

ANTI-SKID BRAKE CONTROL DEVICE AND ASSOCIATED METHOD

This is a division of application Ser. No. 762,782 filed Jan. 25, 1977 now U.S. Pat. No. 4,129,342.

BACKGROUND OF THE INVENTION

This invention relates generally to brake systems and associated methods for use with wheeled vehicles and more particularly to anti-skid brake control devices and associated methods which are designed to automatically reduce the braking torque as exerted on the wheels when the danger of wheel locking is imminent so that the vehicle can be braked efficiently at all times without causing any skidding of the wheels.

Previously known forms of anti-skid brake control device are generally designed so that the brake fluid lines interconnecting the pressure output chamber of the brake fluid pressure producing unit, which is actuated by a brake pedal, and the hydraulic pressure receiving chambers of the brake assemblies, mounted at the respective vehicle wheels, are momentarily closed to reduce the pressure in these chambers when the danger of wheel locking is imminent.

With such anti-skid brake control device, however, there is the danger that the hydraulic pressure in the brake fluid lines could fail and render the brake system ineffective should oil leakage occur in the controlling fluid circuit of the device, which is arranged in connection with the brake fluid lines.

SUMMARY OF THE INVENTION

The present invention is intended to overcome the difficulties previously encountered as described above and has for its object the provision of a new and improved anti-skid brake control device and method for use with wheeled vehicles which is designed to minimize the danger of brake failure as resulting from leakage of hydraulic fluid.

Another object of the present invention is to provide an anti-skid brake control device and method of the character described which is simplified in structure and inexpensive.

The above and other objects and advantages of the present invention will become apparent from the following detailed description when taken in conjunction with the accompanying drawings.

BRIEF DESCRIPTION OF THE DRAWINGS

In the drawings:

FIG. 3 is a characteristic diagram of the command system shown in FIG. 2.

DESCRIPTION OF THE PREFERRED EMBODIMENTS

Figure 1:
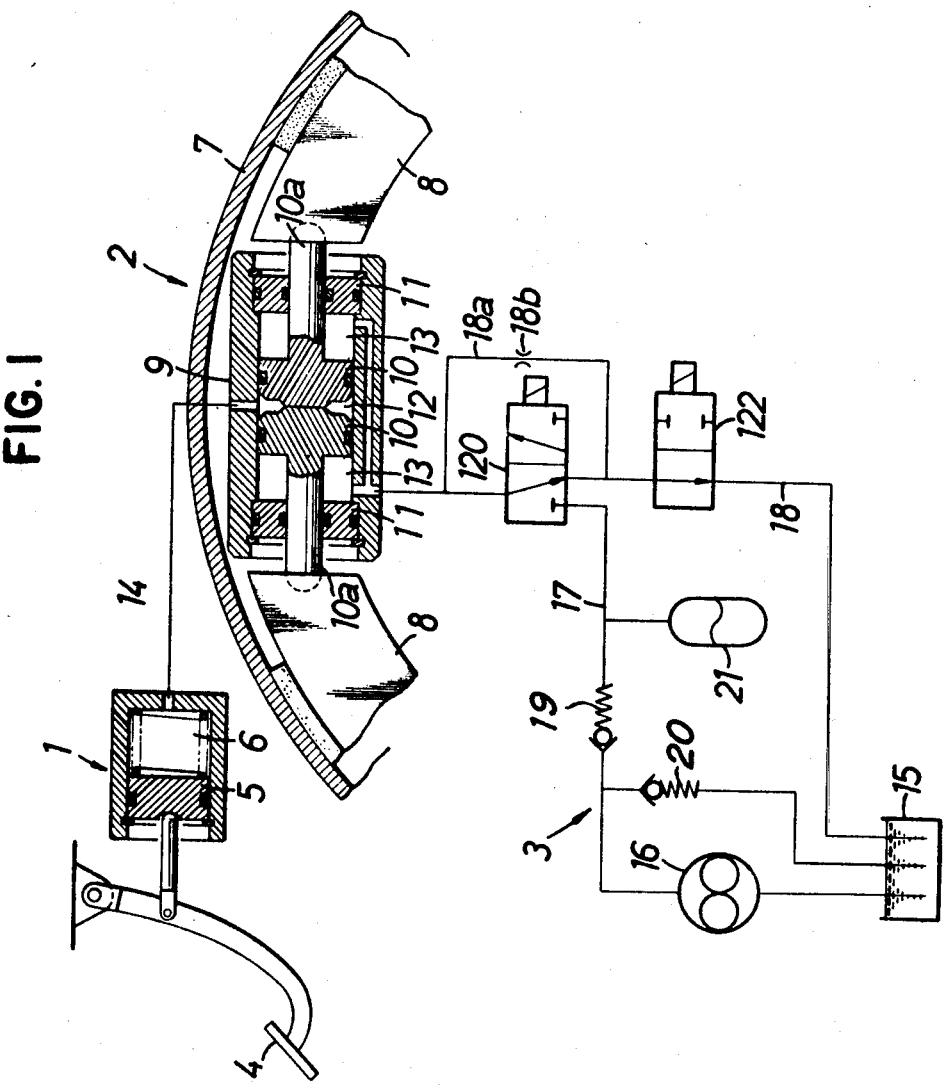
FIG. 1 is a partial schematic illustration of the whole system of the present invention.

Referring first to FIG. 1, which illustrates a form of anti-skid brake control device embodying the present invention, reference numeral 1 generally indicates a brake fluid pressure producing unit; 2 indicates a brake mechanism operable under the pressure output of the fluid pressure producing unit 1 and equipped at each of the vehicle wheels; and 3 indicates a control system provided to feed the brake mechanism 2 with a hydraulic pressure which counteracts the output fluid pressure of the unit 1 to control the braking torque, which the brake mechanism 2 exerts upon the associated wheel. A description will next be made of the construction of these components in order.

The brake fluid pressure producing unit 1 takes the form of a brake master cylinder of well-known construction, which includes a pressure output chamber 6 filled with hydraulic oil and a piston 5 connected with a brake pedal 4 and operable to compress the chamber 6 to produce a desired hydraulic pressure output.

The brake mechanism 2, of the oil hydraulic form, is comprised of a brake drum 7 fixed to the wheel for rotation therewith, a pair of brake shoes 8—8 floatingly or rockably supported inside of the brake drum on a fixed panel, not shown, and a wheel cylinder 9 interposed between the movable end portions of the respective brake shoes 8—8. Slidably fitted in the wheel cylinder 9 are a pair of opposed output pistons which are formed integral with respective piston rods 10a—10a connected with the movable end portions of the brake shoes 8—8. In this manner, there is provided a first hydraulic chamber 12 between the two output pistons 10 with a pair of second hydraulic chambers 13—13 defined between each of the output pistons 10—10 and the adjacent one of end wall members 11—11 secured to the wheel cylinder 9 at its opposite open ends. As shown, the first hydraulic chamber 12 is in fluid communication with the pressure output chamber 6 of the brake master cylinder 1 by way of a brake fluid line 14.

As shown, the control system 3 includes an oil reservoir 15, an oil pressure source pump 16 having a suction port opening into the oil reservoir 15, a high-pressure oil line 17 extending from the delivery port of oil pump 16, and a low-pressure oil line 18 opening at one end into the oil reservoir 15. Both the high-pressure and low-pressure oil lines 17 and 18 are connected at the other end to the pair of second hydraulic chambers 13—13. Inserted in the high-pressure oil line 17 are a non-return valve 19 and a first solenoid valve 120 which is arranged across the high-pressure fluid line 17, provided to connect the pair of second hydraulic chambers 13—13 of the brake mechanism 2 with the oil pressure pump 16, and the low-pressure fluid line 18, provided to connect the pair of second hydraulic chambers 13—13 with the oil reservoir 15, to serve the purpose of selectively placing the two fluid lines 17 and 18 in fluid communication with the pair of second hydraulic chambers 13—13. In the normal state, the solenoid valve 120 is held in a position to place the low-pressure fluid line 18 in communication with the pair of second hydraulic chambers 13—13. Inserted in the low-pressure fluid line 18 is a second solenoid valve 122, which is a normally open control valve. The low-pressure fluid line 18 is connected with a bypass line 18a detouring the first solenoid valve 120 and which includes an orifice or restriction 18b, as shown.

An accumulator 21 is connected with the high-pressure fluid line 17 between the valves 19 and 20.

Figure 2:
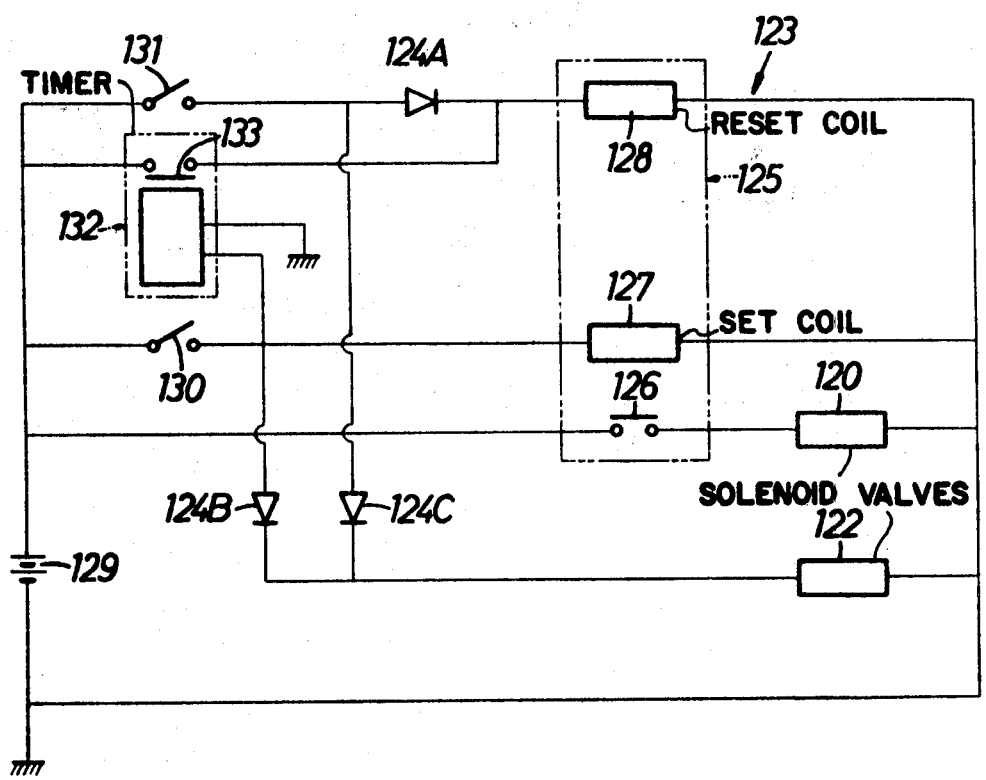
FIG. 2 is an electric circuit diagram illustrating the command system of the embodiment of FIG. 1.

FIG. 2 illustrates an electric circuit connection of a command system 123 provided to control the first and second solenoid valves 120 and 122.

Referring to FIG. 2, the coil of first solenoid valve 120 is connected to a battery 129 through the contact 126 of a keep relay 125, which includes a set coil 127 which acts, when energized, to set the relay contact 126 in its closed position, and a reset coil 128 which acts, when energized, to reset the relay contact 126. As illustrated, a first sensor switch 130 is inserted in the line interconnecting the set coil 127 and the battery 129 while a second sensor switch 131 and a diode 124A are inserted in series connection in the line interconnecting the reset coil 128 and the battery 129. The coil of second solenoid valve 122 is also connected to that side of the first and second sensor switches which is remote from the battery 129 through diodes 124B and 124C, respectively. The first sensor switch 130 is designed to close when it senses an angular deceleration of the wheel, as braked by the brake mechanism 2, which is of a preset threshold value a or above. Similarly, the second sensor switch 131 is designed to close upon sensing an angular acceleration of the wheel which is of a preset threshold value b or above. These sensor switches may take the form of a well-known inertial force sensing switch and any detailed description of their structure is omitted here.

The operation of the command system 123 will next be described with reference to the characteristic diagram of FIG. 3.

When the brake pedal 4 is depressed to actuate the brake master cylinder 1 at the point of time $t_0$ during travel of the vehicle, the output pressure of the brake master cylinder 4 is transmitted to the first hydraulic chamber 12 in the wheel cylinder 9 so that the paired output pistons 10—10 in cylinder 9 are forced outwardly apart from each other to press the brake shoes 8—8 against the internal surface of the brake drum 7 and thus a braking torque corresponding to the hydraulic pressure building up in the first hydraulic chamber 12 is applied to the wheel.

As the braking torque increases, the angular wheel deceleration increases and, when the danger of wheel locking is imminent, that is, when the angular wheel deceleration has reached its preset threshold value a, the first sensor switch 130 closes, sensing such rise of the angular wheel deceleration. The set coil 127 of keep relay 125 is energized through the first sensor switch 130 to close the relay contact 126 and the first solenoid valve 120 is energized therethrough and transferred to the left to open the high-pressure fluid line 17 while at the same time closing the low-pressure fluid line 18. Accordingly, the second hydraulic chambers 13—13 in the wheel cylinder 9 are both fed with oil pressure from the oil hydraulic pump 16 or accumulator 21 and the oil pressure counteracts the oil pressure being fed to the first hydraulic chamber 12. In this manner, the braking torque being exerted upon the wheel by the brake mechanism 2 is rapidly reduced with increase in pressure in the second hydraulic chambers 13—13 so that the danger of wheel locking is effectively avoided.

Subsequently, when the angular wheel deceleration, which decreases as the braking torque continues to decrease, falls to its preset value a at time $t_2$, the first sensor switch 130 reopens but the first solenoid valve 120 is kept in the position transferred to the left by means of the keep relay 125. As a consequence, the second hydraulic chambers 13—13 are also placed in fluid communication with the low-pressure fluid line 18 by way of the bypass line 18a having orifice 18b inserted therein so that part of the pressure oil being fed to the second hydraulic chambers 13—13 through the high-pressure fluid line 17 is allowed to leak into the low-pressure fluid line 18 at a flow rate appropriately limited by the orifice 18b. This reduces the rate of pressure rise in the second hydraulic chambers 13—13 and hence the rate of reduction of the braking torque.

Subsequently, when the angular wheel acceleration, arising upon disappearance of the angular wheel deceleration, reaches a preset value b at time $t_3$, this time the second sensor switch 131 closes, sensing such rise of angular wheel acceleration, to energize the preset coil 128 of keep relay 125 and the relay contact 126 is reset to its open position. As the result, the first solenoid valve 120 restores its normal left position while the second solenoid valve 122 is again energized to assume its closed position. In this manner, the high-pressure and low-pressure fluid lines 17 and 18 are both fully closed so that the oil pressure in the second hydraulic chambers 13—13 is held at a definite level irrespective of the output pressure of the brake master cylinder 1. On this occasion, any excessive rise in pressure in the second hydraulic chambers 13—13 is effectively prevented despite of more or less delay in operation of the second solenoid valve 122 since the rate of pressure rise in the second hydraulic chambers 13—13 has been reduced immediately before the valve operation. Owing to this, the braking torque, of a predetermined magnitude, can be continuously applied without involving the danger of wheel locking.

Subsequently, as the peripheral speed of the wheel approaches the vehicle speed, the angular wheel acceleration begins to decrease and returns to its preset value b when the peripheral speed of the wheel comes fully close to the vehicle speed at time $t_4$. Simultaneously with this, the second sensor switch 131 opens and the second solenoid valve 122 restores its open position to open the low-pressure fluid line so that the pressure in the second hydraulic chambers 13—13 again begins to decrease thereby causing the braking torque to increase. The time required for the braking torque to rise from the predetermined value referred to above to its peak value is relatively short and this means that the length of time during which there is no effective braking action with the peripheral speed of the wheel kept fully close to the vehicle speed is substantially shortened. The process described above is repeated thereafter in substantially the same fashion as described so that the vehicle is efficiently braked without involving any wheel skidding.

In this connection, there is no assurance that the second sensor switch 131 closes to reset the keep relay 125 when the vehicle comes to stop under the operation of control system 3. If the vehicle comes to stop with the keep relay 125 held in its set position, that is, with the relay contact 126 held closed, the second hydraulic chambers 13—13 in wheel cylinder 9 will be held at raised pressure for a relatively long period of time on account of the throttling effect of orifice 18b, thus involving the danger of causing trouble in the next cycle of braking operation.

To avoid this, the command system 123 illustrated is provided with an off-delay timer 132 which is operable upon the output signal from the first sensor switch 130 with a timer contact 133 connected to the reset coil 128 of keep relay 125 in parallel with the second sensor switch 131. The timer contact 133 is arranged so as to open when reset and be held in set or closed position only during a period of time elapsing from the point of time at which the first sensor switch 130 is closed until a predetermined length of time after the re-opening of the sensor switch 130.

With this arrangement, even if the second sensor switch 131 remains open, the keep relay 125 is reset without fail under the resetting action of the off-delay timer 132 if only the first sensor switch 130 opens and when the predetermined length of time has elapsed after the switch opening, and accordingly any danger of causing trouble in the next cycle of braking operation, as stated above, is effectively eliminated. Obviously, the time of delay in opening of the timer contact 133, as elapsing after the opening of first sensor switch 130, should be so determined as to be longer than the length of time elapsing between the opening of the first sensor switch 130 and the closing of the second sensor switch 131, which is usually 0.05 second or less, in order not to incur any trouble in the normal anti-skid control operation.

According to this embodiment, when in a braking operation, the angular wheel deceleration is reduced below its preset threshold value after the braking torque has been rapidly reduced in order to avoid the danger of wheel locking. The rate of reduction in braking torque is reduced and subsequently the braking torque is held at a definite reduced level until the angular acceleration of the wheel, arising upon disappearance of the angular wheel deceleration and once rising above a preset threshold value, returns to this value. In this manner, the reduction in braking torque can be kept to a required minimum and, accordingly, the width of variation in braking torque value from its bottom to its peak and hence the length of time required for the braking torque rise to its peak value can be effectively reduced; that is to say, the braking torque can be rapidly restored for effective braking operation without causing any substantial vibration to the vehicle. This not only eliminates the danger of impairing the driver's feeling in braking operation but also improves the braking efficiency, enabling reduction in braking distance of the vehicle.

Though a preferred embodiment of the present invention has been shown and described, it will be apparent to those skilled in the art that various changes and modifications may be made therein without departing from the spirit of the invention or from the scope of the appended claims.

What is claimed is:

1. In a brake system for use with wheeled vehicles including a brake fluid pressure producing unit, an anti-skid brake control device comprising:
    an oil-hydraulic brake mechanism associated with a vehicle wheel and including an operating member, a first hydraulic chamber defined on one side of said operating member for hydraulically driving the latter, and a second hydraulic chamber defined on the opposite side of said operating member to apply thereon an oil-hydraulic pressure counteracting the oil-hydraulic pressure applied to said operating member on said one side thereof, said first hydraulic chamber being held in fluid communication with said brake fluid pressure producing unit;
    a source of fluid pressure;
    a high-pressure fluid line extending between said second hydraulic chamber in said brake mechanism and said source of fluid pressure;
    an oil reservoir;
    a low-pressure fluid line extending between said second hydraulic chamber in said brake mechanism and said oil reservoir;
    fluid control valve means inserted in said high-pressure and low-pressure fluid lines; and command system means connected with said fluid control valve means for effecting a repeated braking process in which the braking torque as applied to the wheel is rapidly reduced when the angular deceleration of the wheel exceeds a predetermined threshold value, the reducing rate of the brake torque being reduced when the angular deceleration of the wheel returns to said predetermined threshold value, is subsequently held at a definite level during the period of time that the angular acceleration of the wheel arising upon disappearance of the angular wheel deceleration is held above a predetermined threshold value, and finally begins again to rise when the angular acceleration of the wheel falls below said predetermined threshold value.

2. An anti-skid brake control method adapted for use with wheeled vehicles, said method comprising the steps of:
    rapidly reducing a brake torque as applied to a wheel when the angular deceleration of the wheel exceeds a predetermined threshold value;
    reducing the reducing rate of the brake torque when the angular deceleration of the wheel returns to said predetermined threshold value;
    holding the brake torque at a definite level during the period of time that the angular acceleration of the wheel arising upon disappearance of the angular wheel deceleration remains above a predetermined threshold value;
    increasing the brake torque when the angular acceleration of the wheel falls below said predetermined threshold value; and
    repeating the above-described sequence of steps until the vehicle is stopped.

* * * * *